(12) United States Patent
Hamann

(10) Patent No.: US 6,708,494 B1
(45) Date of Patent: Mar. 23, 2004

(54) DEVICE FOR UTLILIZING GEOTHERMAL HEAT AND METHOD FOR OPERATING THE SAME

(75) Inventor: Jochen Hamann, Diesbar-Seussliz (DE)

(73) Assignee: Klett-Ingenieur-GmbH, Fellbach (DE)

( * ) Notice: Subject to any disclaimer, the term of this patent is extended or adjusted under 35 U.S.C. 154(b) by 114 days.

(21) Appl. No.: 10/030,280

(22) PCT Filed: Jul. 1, 2000

(86) PCT No.: PCT/EP00/06163

§ 371 (c)(1),
(2), (4) Date: Apr. 1, 2002

(87) PCT Pub. No.: WO01/04550

PCT Pub. Date: Jan. 18, 2001

(30) Foreign Application Priority Data

Jul. 9, 1999 (DE) .......................... 199 32 001
Nov. 4, 1999 (DE) .......................... 199 53 072

(51) Int. Cl.[7] ................................. F03G 7/00
(52) U.S. Cl. .................. 60/641.3; 60/641.2; 60/641.4
(58) Field of Search ..................... 60/641.2, 641.3, 60/641.4, 641.5

(56) References Cited

U.S. PATENT DOCUMENTS 3,908,381 A * 9/1975 Barber et al. ............. 60/641.4
4,201,060 A * 5/1980 Outmans .................... 60/641.2
4,429,535 A * 2/1984 Featherstone .............. 60/641.5
4,644,750 A   2/1987 Lockett et al.
4,844,162 A * 7/1989 Maassen et al. ............ 166/267

FOREIGN PATENT DOCUMENTS

| DE | 1601325     | 1/1971  |
| DE | 30 06 380   | 9/1981  |
| DE | 39 06 135 A1| 8/1990  |
| FR | 2482272     | 11/1981 |
| WO | 95/30863    | 11/1995 |

* cited by examiner

Primary Examiner—Hoang Nguyen
(74) Attorney, Agent, or Firm—Michael J. Striker

(57) ABSTRACT

An apparatus and a method for using geothermal energy include the use of at least a first conduit, through which a working substance is carried downward into the interior of the Earth, at least one second conduit, through which the working substance is carried upward, in the direction of the surface of the Earth, with the first and second conduits form a closed system relative to the soil, wherein the working substance is carried downward into the interior of the Earth, and the throttling region throttles the largely liquid working substance upstream, in the flow direction, of the throttling region to a vaporization pressure, so that downstream of the throttling region the working substance is largely completely vaporizable.

20 Claims, 3 Drawing Sheets

DEVICE FOR UTLILIZING GEOTHERMAL HEAT AND METHOD FOR OPERATING THE SAME

BACKGROUND OF THE INVENTION

The invention is based on an apparatus for using geothermal energy and method of generating it.

A heat flow, flowing from the interior of the Earth, can be ascribed to an extent of about 80% to the decay of radioactive isotopes in rocks, and about 20% to the primordial heat generated in the creation of the Earth. The temperature from the Earth's surface to the interior of the Earth increases by about 30° C. every 1000 meters. In the vicinity of geothermal anomalies, greater temperature increases can occur, for instance because of a geographic closeness to hot magma chambers (intrusions) in the crust of the Earth, flows of deep-seated bodies of water, and so forth. Such regions are especially preferred for utilizing the geothermal energy.

The geothermal energy can be stored in various substances, fundamentally in water vapor, water, and/or hot strata of rock.

Stored water vapor is usually located in the vicinity of active volcanoes and highly fissured or water-bearing bedrock. The vapor can be carried to the Earth's surface and—after an often-necessary separation of entrained water—used to generate electricity. However, usable vapor sources exist in only a few regions.

The energy stored in the hot water in strata of the Earth are as a rule reached by an apparatus known as a doublet. The doublet has a feed bore, through which the hot water from the various strata of the Earth can be pumped to the Earth's surface. To prevent the hydrostatic pressure in the strata from dropping over time, and to avoid lessening the inflow of hot water and in particular to enable better utilization of the heat of the rock, the cooled water is returned to the corresponding strata of the Earth via an injection bore. From the injection bore, the water can flow through the rock to the feed bore and is heated in the process. The water pumped out of the strata of the Earth is as a rule used for space heating.

For tapping the energy stored in hot layers of rock, a so-called hot dry rock process is known. In this process, in a first method step a first deep hole is drilled down to about 5000 meters. Via the deep hole, water is forced at high pressure to a depth of about 5000 meters into the rock, causing cracks to form in the rock. With a second deep hole, at a distance of about 500 meters, the region where the cracks have formed is drilled into. Next, water can be pumped into the rock via one deep hole and carried through the cracks to the second deep hole and then pumped, heated, to the Earth's surface via the second deep hole. To avoid expensive dry holes, the cracks in the rock have to be located. At a depth of 5000 meters, this is especially difficult and complicated.

Another apparatus of this generic type is known that has three concentrically arranged pipes, specifically a so-called outer descending pipe, a cladding tube, and an inner riser pipe. Cold water is pumped downward into the interior of the Earth through the descending pipe, heated, and having been heated, is pumped upward through the riser pipe. An annular gap with air between the riser pipe and the cladding tube serves as an insulator between the outer descending pipe and the inner riser pipe. The pipes are surrounded on the outside, toward the soil, by a water-impermeable suspension, for instance of betonite. A mass transfer with the soil is avoided. However, the efficiency for generating electrical energy is low.

U.S. Pat. No. 4,644,750 discloses an apparatus of this generic type, in which a working substance is pumped downward into the ground via a first pipe into a deep hole and upward via capillaries. By capillary action, the attempt is made to keep external power for pumping the working substance upward from below as slight as possible

SUMMARY OF THE INVENTION

The object of the invention is to refine the apparatus of this generic type and in particular to create an apparatus and a method with which, economically and in a way that can be achieved simply from a technological standpoint, a circular process for recovering energy can be created, which is maintained without external power or with only very slight external power.

The invention is based on an apparatus for using geothermal energy, having at least a first conduit, through which a working substance is carried downward into the interior of the Earth, and having at least one second conduit, through which the working substance is carried upward, in the direction of the surface of the Earth, and the first and second conduits form a closed system relative to the soil.

It is proposed that the working substance is carried downward into the interior of the Earth, and the throttling region throttles the largely liquid working substance upstream, in the flow direction, of the throttling region to a vaporization pressure, so that downstream of the throttling region the working substance is largely completely vaporizable. The working substance can advantageously be carried downward in the liquid state and upward in the gaseous state, at lower density. The liquid pressure that builds up, or the force of gravity acting on the liquid, can be utilized for a requisite pressure elevation in a clockwise cycle process, and as a result an especially high efficiency can be achieved, especially in the generation of electrical energy. In principle, however, a pump can also be used to generate a requisite pressure upstream of the throttling region; the pump acts to reinforce the liquid column or generates the requisite pressure by itself.

Once the working substance downstream of the throttling region has vaporized extensively, and advantageously completely, it flows upward to the Earth's surface. During operation of the apparatus, it is possible to avoid introducing an external power, in particular pumping power, which thus enhances the efficiency. A slight pressure drop is established in the second conduit, from bottom to top in the gas column. At the Earth's surface, the working substance in vapor form has a much higher pressure than in an initial state of the process, and this can especially advantageously be used to generate electrical energy. The throttling region can be formed by one throttling point, or advantageously by a plurality of throttling points, which are disposed spaced apart from one another in the flow direction. When there are more than one throttling point, an especially high pressure can be achieved in the upper region of the second conduit.

In a further feature of the invention, it is proposed that a compressor, by way of which the working substance is compressable upstream of the throttling region, is disposed downstream in the flow direction of the second conduit. The throttling region can especially advantageously be disposed in the upper region of the first conduit, and a large temperature difference between the working substance and the interior of the Earth, and as a result a good heat transfer to from the interior of the Earth to the working substance, can advantageously be achieved over the entire first conduit. The energy delivered from the interior of the Earth can advantageously be utilized for vaporization, at a largely constant vaporization temperature of the working substance. In the second conduit, the working substance largely has the same temperature as in the first conduit, as a result of which an insulation between the conduits can be omitted. To recover a high quantity of heat, even a slight hole depth can already suffice.

The throttling region can fundamentally be formed by one or more throttling points that appear suitable to one skilled in the art. Especially advantageously, however, at least one throttling point is formed by at least one pipe. Given an adequate throttling action, a relatively low flow velocity through the throttling point and thus low wear and a long service life can be achieved.

In one feature of the invention, it is proposed that the first and second conduits communicate to form a closed system; that is, they communicate in closed fashion not only underground but also above ground. The working substance can be prevented from escaping from the system, and a working substance with which an especially high efficiency can be achieved at the lowest possible cost can advantageously be employed.

If the working substance has a lower boiling temperature than water, then in comparison to water-driven apparatuses, the working substance can already be made to vaporize at lesser depths or lower temperatures, so that drilling costs in particular can be saved. Conventional refrigerants, such as ammonia in particular, are advantageously suitable as the working substance.

To reduce the flow velocity in the first conduit and to increase the service area and thereby improve the heat transfer to the working substance, at least one element deflecting the working substance is advantageously placed at least downstream of the throttling region in the first conduit. Filler bodies, which deflect the working substance, can advantageously be introduced into the first conduit. In a further feature, it is proposed that instead of filler bodies, at least one pathway extending spirally downward is introduced, by way of which pathway the working substance is carried against the outer wall of the first conduit, as a result of which an advantageous film vaporization on the outer wall of the first conduit can be achieved. The pathway can be made from various materials; for instance, the pathway can be formed by a sheet-metal part, or it can also be embodied integrally with a conduit wall. Preferably, the pathway does not have any sealing function in the conduit.

In one feature of the invention, the first and second conduits are disposed in a deep hole that is lined imperviously, and the working substance is carried through an inner pipe downward in the radially outer region inside the deep hole and upward in the radially inner region of the deep hole. Additional deep holes can thus be dispensed with and the attendant costs eliminated. Furthermore, the conduits can be made to communicate in closed fashion underground in an especially simple, inexpensive way. In principle, however, the working substance can also be carried downward via one or more deep holes and upward via one or more other deep holes separate from the first group.

DRAWING

Further advantages will become apparent from the ensuing description of the drawing. The drawing shows one exemplary embodiment of the invention. The drawing, description and claims include numerous characteristics in combination. One skilled in the art will expediently assess the characteristics individually as well and put them together to make useful further combinations.

DESCRIPTION OF THE PREFERRED EMBODIMENTS

Figure 1:
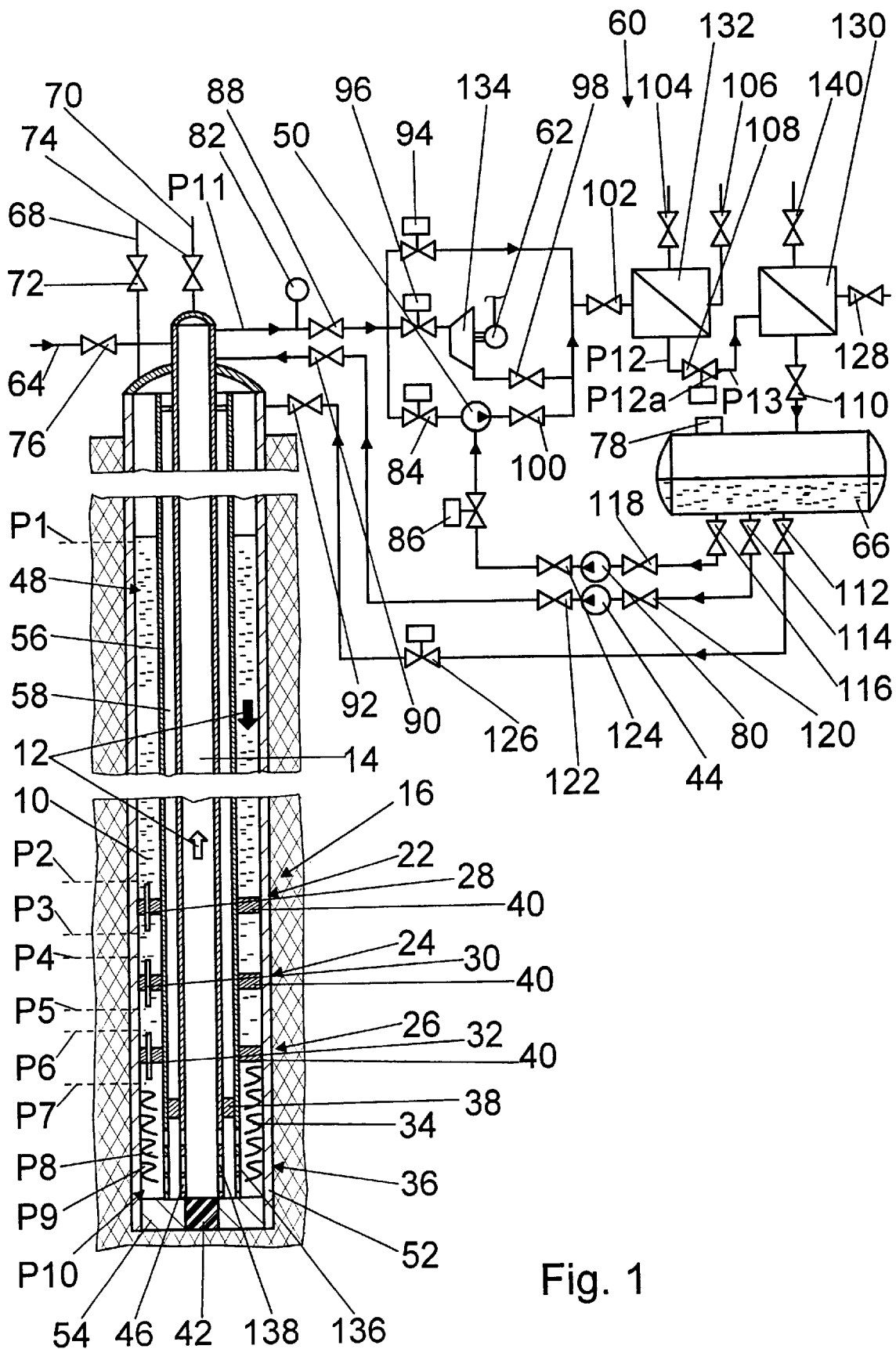
FIG. 1, a schematic illustration of an apparatus according to the invention.

FIG. 1 shows an apparatus according to the invention for using geothermal energy, having a first conduit 10 through which a working substance 12 is carried downward into the interior of the Earth, and having a second conduit 14 through which the working substance 12 is carried upward in the direction of the Earth's surface. The first conduit 10 is formed by a first outer pipe 52, which is inserted into a deep hole 36 and lines the deep hole 36 imperviously toward the outside. The outer pipe 52 is tightly closed at its face end on the lower end. The second conduit 14 is formed by an inner pipe 46, disposed concentrically to the outer pipe 52 in the radially inner region of the deep hole 36. The inner pipe 46 is surrounded by a cladding tube 56, which for insulation purposes encloses an annular gap 58 with air relative to the inner pipe 46 and which defines the first conduit 10 radially toward the inside. The first and second conduits 10, 14 are connected jointly to an equipment system 60 to make a closed system, so that the ammonia used as the working substance 12 cannot escape to the outside.

According to the invention, the first conduit 10 has a throttling region 16, with three throttling points 22, 24, 26 disposed in line with one another in the flow direction. The throttling points 22, 24, 26 are each disposed spaced apart from one another and are each formed by a respective pipe 28, 30, 32 secured in a flange 40.

When the apparatus is constructed, the outer pipe 52, cladding tube 56 and inner pipe 46 are already introduced jointly and concentrically in segments as the deep hole 36 is drilled. The segments are tightly joined to one another by welding at the axial abutting points. In principle, however, the segments can also be tightly joined by various methods that appear useful to one skilled in the art, by material engagement, positive engagement and/or nonpositive engagement.

The flange 40 can be secured between the outer pipe 52 and the cladding tube 56 by various methods that appear suitable to one skilled in the art. Especially advantageously, however, the flange will be solidly welded to the outer pipe 52 and the cladding tube 56 before the pipes 46, 52, 56 are introduced into the deep hole 36. To prevent the first conduit 10 from becoming soiled during drilling, and to prevent drilling sludge and/or a suspension from entering the first conduit 10, the first conduit 10 in the bottommost segment is closed with a steel plate 54 on the axial face end even before being introduced into the deep hole 36. A drill head of a drilling apparatus, not shown in detail, can be passed upward and downward in the collapsed state through the inner pipe 46. The second conduit 14 can be cleaned after the drilling process has been concluded. Once the deep hole 36 is finished, the inner pipe 46 is tightly closed off from the soil on its downward-pointing axial face end by a plastic plate 42. In addition, the axial face end of the inner pipe 46 can be tightly closed off from the soil by any methods appearing suitable to one skilled in the art, for instance by compound filling, and/or by press-fitting of a teflon body, making it possible to create a nonpositive and positive closure. It is also possible for the cladding tube 56 and/or the inner pipe 46 not to be introduced into an outer pipe, which is tightly closed on its downward-pointing face end, until afterward.

Before the inner pipe 46 and the cladding tube 56 are introduced, openings 136, 138 or bores are made in their bottommost segments. The openings 138 in the inner pipe 46 are then closed again by nonpositive and positive engagement or in some suitable way before the introduction, so that on the one hand they reliably prevent the voids between the pipes 46, 52, 56 from becoming contaminated on the other hand they become open again because of the pressure difference, caused upon filling with ammonia, between the first conduit 10 and the second conduit 14. Either the openings 136, 138 or only the openings 138 can, however, also be made later, after the pipes 46, 52, 56 are introduced, or they can be closed with substances that chemically dissolve in ammonia but are resistant to the substances used in drilling the hole.

At the beginning of putting the apparatus into operation, all the valves 72, 74, 76 and 84–128, 140 are opened. In order to fill the first conduit 10 completely with liquid ammonia as fast as possible, liquid ammonia is introduced into the apparatus at a pressure of about 25 bar via a line 64 and via the second conduit 14. If there is only one throttling point in the first conduit 10, then the apparatus can also be filled via the first conduit 10. The apparatus is ventilated via lines 68, 70, which empty into a water bath, not identified by reference numeral. Once air bubbles are no longer rising upward in the water bath, the valves 72, 74 in the lines 68, 70 can be closed. Once a certain fill level is detected by a fill level gauge 78 in a condensate reservoir 66, the valve 76 in the line 64 is closed. The valves 94, 96 and 98 are also closed.

Next, via a jet pump 50, which is supplied with ammonia from the condensate reservoir 66 by a driving jet pump 80, the pressure p in the second conduit 14 is reduced, and as a result the ammonia in the second conduit 14 is vaporized. The ammonia pumped by the jet pump 50 is condensed in a heat exchanger 130 and returned to the condensate reservoir 66.

If a temperature that indicates that the ammonia in the second conduit 14 has vaporized completely or at least extensively is detected at a measurement point 82, the driving jet pump 80 is switched off, and the valves 84, 86 are closed. In order to dissipate heat solely via a heat exchanger 132 to a consumer, not identified by reference numeral, only the valve 94 is then opened. To generate electrical energy with a turbine 134 and a generator 62, the valves 96 and 98 are opened.

Figure 2:
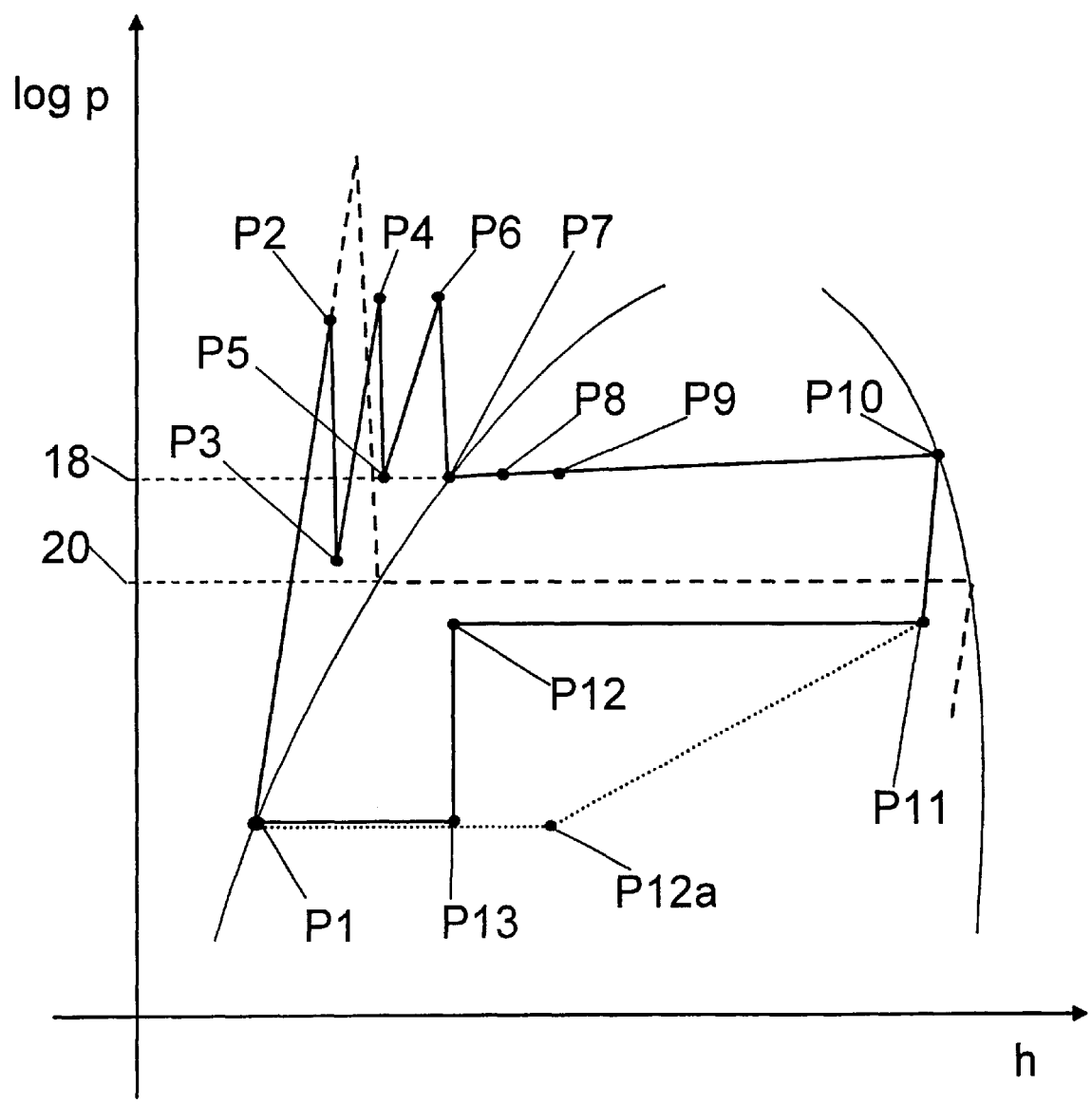
FIG. 2, method sequences in a graph of pressure and enthalpy.

During the operation of the apparatus, liquid ammonia from the condensate reservoir 66 is carried into the first conduit 10 via the valves 126 and 92. In a first region 48 of the first conduit 10, the ammonia is liquid. From the starting point P1 in the upper region of the liquid column that develops in the first conduit 10, the pressure p increases toward the bottom as a consequence of gravity, and specifically the pressure p at point P1 is about 25 bar, while at point P2, at a depth of 1650 meters, it is about 100 bar (FIG. 2). The pressure p is throttled by the throttling point 22 at the depth of 1650 meters. Downstream of the throttling point 22, the pressure p at P3 is about 45 bar. From P3 to P4, the pressure p increases as a consequence of the gravity in the liquid column, and at P4, at the depth of 2850 meters, it amounts to about 105 bar. From P4 to P5, the pressure p is throttled by the second throttling point 24 at the depth of 2850 meters. From P5 to P6, the pressure p increases to about 105 bar, at the depth of 3850 meters. From P6 to P7, the pressure p is throttled by the third throttling point 26, at the depth of 3850 meters, to a vaporization pressure 18 of about 60 bar. Between the throttling points 22, 24, 26, heat from the ground is continuously supplied to the ammonia, and as a result the enthalpy h increases between the throttling points 22, 24, 26.

The enthalpy h increases from P7 to P8 at a constant pressure p as a consequence of the pressure energy, from P8 to P9 as a consequence of the cooling down of the superheated ammonia, and from P9 to P10 as a consequence of the supply of heat from the ground. To achieve a good heat transfer from the ground to the ammonia, filler bodies 34 (FIG. 1) are introduced downstream of the bottommost throttling point 26 in the first conduit 10. At point P10, at a depth of about 4600 meters, the ammonia has vaporized completely and can flow from the first conduit 10 into the second conduit 14 via the openings 136, 138 in the cladding tube 56 and the inner pipe 46, respectively (FIG. 1). To prevent the ammonia gas in the annular gap 58, between the cladding tube 56 and the inner pipe 46, from rising to the top, the annular gap 58 is closed off by a stopper element 38 above the openings 136, 138, in the direction of the Earth's surface. The stopper element 38 is secured, like the flange 40 of the throttling points 22, 24, 26, before the introduction into the deep hole 36. The ammonia gas flows upward to the Earth's surface in the second conduit 14. The pressure p and the enthalpy h decrease from P10 to P11. At point P11, the ammonia gas is at about 40 bar, that is, about 15 bar more than at the starting point P1. The energy excess from P11 to P1 can be utilized to dissipate heat to consumers—P11-P12-P13-P1—or can be utilized to generate electrical energy and to dissipate heat—P11-P12a-P1. The result is a closed, clockwise cycle process. Instead of operating the apparatus with a plurality of throttling points 22, 24, 26, it can also be operated with only one throttling point. In FIG. 2, a dashed line indicates a method sequence of an apparatus with only one throttling point. In comparison to a plurality of throttling points, the ammonia is throttled to a lower vaporization pressure 20.

For regulating capacity, the inflow from the condensate reservoir 66 into the first conduit 10 can be regulated via the valve 126. The liquid column should not drop below the first throttling point 22. To turn off the apparatus, either the supply from the condensate reservoir 66 to the first conduit 10 can be disrupted, or the liquid ammonia can be pumped out of the condensate reservoir 66 into the inner pipe 46 via a pump 44, as a result of which the apparatus can be switched off especially quickly. The pump 44 can also be used to resume operation.

Figure 3:
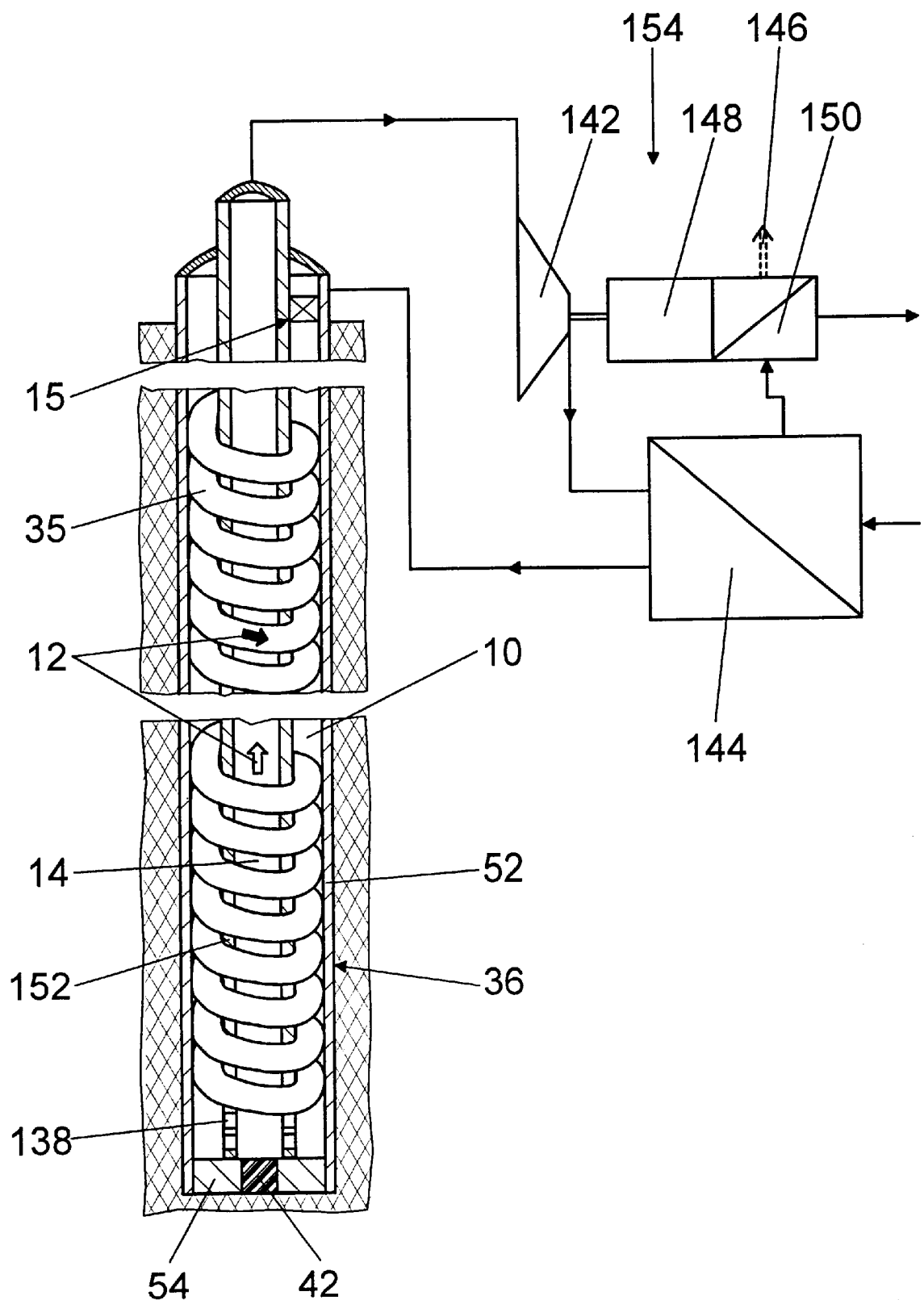
FIG. 3, a variant of FIG. 1.

FIG. 3 shows a variant of the apparatus shown in FIG. 1. Components that remain essentially the same are all identified by the same reference numerals. The apparatus has a first conduit 10, through which the working substance 12 is carried downward into the interior of the Earth, and a second conduit 14, through which the working substance 12 is carried upward, in the direction of the Earth's surface. The first conduit 10 is formed by an outer pipe 52, which is inserted into a deep hole 36 and lines the deep hole 36 imperviously toward the outside. The outer pipe 52 is tightly closed at its face end on the lower end. The first conduit 10 is bounded radially inward by an inner pipe 152, which is disposed concentrically with the outer pipe 52 and forms the second conduit 14. A pathway 35 extending spirally downward is placed in the first conduit 10, between the pipes 52 and 152; it deflects the working substance 12 against the outer wall of the first conduit 10 and against the inside surface of the outer pipe 52, as applicable. The pathway 35 furthermore serves as a spacer between the pipes 52 and 152. The pathway 35 can extend over the entire length of the conduit 10 or can advantageously be disposed in segments of various lengths, between which there is a spacing. The pathway 35 does not take on any sealing function in the first conduit 10. The first and second conduits 10, 14 are connected jointly to an equipment system 154 to form a closed system, so that the ammonia used as the working substance 12 cannot escape to the outside.

The ammonia in vapor form flowing upward in the second conduit 14 is compressed in a compressor 142 downstream of the second conduit 14, specifically to about 25 bar, and in the process is heated or superheated to approximately 130° C.

In a heat exchanger 144 downstream of the compressor 142, heating water is heated in three phases, specifically in a first phase by cooling of the ammonia down to a temperature of condensation, in a second, primary phase by condensation of the ammonia, and in a third phase by cooling down of the condensate. The heating water is further heated, in an exhaust gas heat exchanger 150 downstream of the heat exchanger 144, by exhaust gases 146 from a motor 148 of the compressor 142.

Downstream of the heat exchanger, the working substance 12 is about 45° C., and downstream of the heat exchanger 144 it is carried via a throttling region 15, disposed in the upper region of the first conduit 10, or via a throttling point, and in the process is throttled from about 25 bar to a vaporization pressure of about 4 bar. The throttling region 15 or a throttling point can also be disposed in a line upstream of the first conduit 10.

As a result of the throttling, the working substance 12 is cooled down to about 0° C. The liquid working substance 12 is carried through the pathway 35 downward and by centrifugal force against the outer wall of the first conduit 10, where film vaporization occurs. The vaporized working substance 12 is carried downward in the first conduit 10 and upward in the second conduit 14 by a resultant total flow. In the first and second conduits 10, 14, the working substance 12 essentially maintains its vaporization temperature of approximately 0° C. An especially good heat transfer from the interior of the Earth to the working substance 12 can be achieved, and it is furthermore possible to dispense with an insulation between the first conduit 10 and the second conduit 14.

What is claimed is:

1. An apparatus for using geothermal energy and for recovering energy, comprising at least a first conduit through which a working substance is carried downwards into an interior of the Earth into a deep hole, at least one second conduit through which the working substance is carried upwards in a direction of a surface of the Earth, said first and second conduits forming a closed system relative to a soil; at least one throttling region through which the working substance is carried downwards into the interior of the Earth, so that the working substance is also in heat exchange with its surroundings as it is being carried downwards, said throttling region throttling the working substance which is substantially a liquid working substance upstream in a flow direction of said throttling region to a vaporization pressure, so that downstream of said throttling region the working substance is substantially completely vaporizable.

2. An apparatus as defined in claim 1, wherein said throttling region is formed so as to elevate a pressure upstream of said throttling region, and a force of gravity acting on a liquid column, dammed up upstream of said throttling region, of the working substance is utilized.

3. An apparatus as defined in claim 2; and further comprising a plug disposed upstream of said throttling region for elevating the pressure.

4. An apparatus as defined in claim 1, wherein said throttling region is formed by a first and at least one second throttling point which is disposed at a spacing in the flow direction from said first throttling point.

5. An apparatus as defined in claim 1; and further comprising a compressor by which the working substance is compressible upstream of said throttling region, said compressor being disposed downstream in the flow direction of said second conduit.

6. An apparatus as defined in claim 5; and further comprising at least one heat exchanger, said compressor being disposed upstream in a flow direction of said at least one heat exchanger.

7. An apparatus as defined in claim 6; and further comprising a motor that drives said compressor; and an exhaust gas heat exchanger arranged so that the exhaust gasses of said motor are carried through said exhaust gas heat exchanger.

8. An apparatus as defined in claim 1, wherein said throttling region is disposed in an upper region of said first conduit which extends downwardly.

9. An apparatus as defined in claim 1, wherein said throttling region has at least one throttling point which is formed by at least one pipe.

10. An apparatus as defined in claim 1, wherein said first and second conduits communicate to form the closed system.

11. An apparatus as defined in claim 1, wherein the apparatus is formed so that it uses the working substance which has a lower boiling temperature at the same pressure than water.

12. An apparatus as defined in claim 11, wherein the working substance is ammonia.

13. An apparatus as defined in claim 1; and further comprising at least one element deflecting the working substance at least downstream of said throttling region in said first conduit.

14. An apparatus as defined in claim 13; and further comprising filler bodies that deflect the working substance and are introduced into said first conduit.

15. An apparatus as defined in claim 13; and further comprising at least one pathway extending spirally downwards and introduced into said first conduit, so that the working substance is carried by said pathway against an outer wall of said first conduit.

16. An apparatus as defined in claim 1, wherein said first and second conduits are disposed in a deep hole that is lined imperviously; and further comprising an inner pipe through which the working substance is carried downwardly in a radially outer region inside the deep hole and upwards in a radially inner region of the deep hole.

17. A method of operating an apparatus comprising at least a first conduit through which a working substance is carried downwards into an interior of the Earth into a deep hole, at least one second conduit through which the working substance is carried upwards in a direction of a surface of the Earth, said first and second conduits forming a closed system relative to a soil; at least one throttling region through which the working substance is carried downwards into the interior of the Earth, so that the working substance is also in heat exchange with its surroundings as it is being carried downwards, said throttling region throttling the working substance which is substantially a liquid working substance upstream in a flow direction of said throttling region to a vaporization pressure, so that downstream of said throttling region the working substance is substantially completely vaporizable, the method comprising the steps of throttling the working substance which in a first region of the first conduit is substantially liquid, in a second region to a vaporization pressure; subsequently vaporizing the working substance substantially completely; and carrying it in a vapor state upwards in the second conduit.

18. A method as defined in claim 17; and further comprising throttling the working substance in the second region by a first and at least a second throttling point to the vaporization pressure in at least two steps; and supplying heat between the throttling points to the working substance.

19. A method as defined in claim 17; and further comprising supplying the working substance via the second conduit when the apparatus is put into an operation.

20. A method as defined in claim 19; and further comprising reducing a pressure in the second conduit when the apparatus is put into operation after being filled, with a pump; and vaporizing the working substance in the second conduit.

* * * * *